United States Patent
Sugiyama

(10) Patent No.: US 11,412,205 B2
(45) Date of Patent: Aug. 9, 2022

(54) VEHICLE DISPLAY DEVICE

(71) Applicant: Yazaki Corporation, Tokyo (JP)

(72) Inventor: Tetsuya Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/210,475

(22) Filed: Mar. 23, 2021

(65) Prior Publication Data

US 2021/0306618 A1 Sep. 30, 2021

(30) Foreign Application Priority Data

Mar. 27, 2020 (JP) .............................. JP2020-057330

(51) Int. Cl.
| | |
|---|---|
| G09G 5/00 | (2006.01) |
| H04N 13/302 | (2018.01) |
| H04N 13/398 | (2018.01) |
| B60K 35/00 | (2006.01) |
| G02B 27/01 | (2006.01) |
| H04N 9/31 | (2006.01) |

(52) U.S. Cl.
CPC ........... *H04N 13/302* (2018.05); *B60K 35/00* (2013.01); *G02B 27/0101* (2013.01); *H04N 9/3141* (2013.01); *H04N 13/398* (2018.05); *B60K 2370/1529* (2019.05); *B60K 2370/166* (2019.05); *B60K 2370/167* (2019.05); *G02B 2027/0132* (2013.01)

(58) Field of Classification Search
CPC ........................... B60R 1/00; B60R 2300/303
See application file for complete search history.

(56) References Cited

U.S. PATENT DOCUMENTS

| | | | |
|---|---|---|---|
| 2011/0001639 A1* | 1/2011 | Sasaki ................ | G02B 27/0101 340/995.19 |
| 2013/0194674 A1* | 8/2013 | Horiuchi ............ | G02B 27/0101 359/631 |
| 2013/0235200 A1 | 9/2013 | Giesler et al. | |
| 2017/0269684 A1 | 9/2017 | Murai | |

FOREIGN PATENT DOCUMENTS

| | | |
|---|---|---|
| DE | 10 2014 211161 A1 | 12/2015 |
| JP | 2013-112269 A | 6/2013 |
| JP | 2016-130771 A | 7/2016 |

(Continued)

*Primary Examiner* — Nan-Ying Yang
(74) *Attorney, Agent, or Firm* — Kenealy Vaidya LLP

(57) ABSTRACT

In a vehicle display device, in a case of displaying an outside information virtual image in a right monocular viewing region and a left monocular viewing region, a controller performs a display image control for a display image displayed by an image projection unit by using a viewability display form with a more excellent viewability than in a case of displaying the outside information virtual image in a binocular viewing region. In a case of displaying the outside information virtual image in the binocular viewing region, the controller performs a display image control by using the identifiability display form that provides a more excellent recognizability of the outside information virtual image for the driver than in a case of displaying the outside information virtual image in the right monocular viewing region and the left monocular viewing region.

8 Claims, 10 Drawing Sheets

(56) References Cited

FOREIGN PATENT DOCUMENTS

| JP | 2016-137817 A | 8/2016 |
| JP | 2017-170949 A | 9/2017 |
| JP | 2017-171146 A | 9/2017 |
| JP | 2019-56884 A | 4/2019 |
| WO | 2015/189179 A1 | 12/2015 |

\* cited by examiner

VEHICLE DISPLAY DEVICE

CROSS-REFERENCE TO RELATED APPLICATION(S)

The present application claims priority to and incorporates by reference the entire contents of Japanese Patent Application No. 2020-057330 filed in Japan on Mar. 27, 2020.

BACKGROUND OF THE INVENTION

1. Field of the Invention

The present invention relates to a vehicle display device.

2. Description of the Related Art

In recent years, for example, a head-up display (HUD), which projects a display image displayed on a display device onto a windshield or the like via a reflection mirror or the like to allow a driver to view the display image as a virtual image, may be mounted on a vehicle such as an automobile. Examples of the head-up display include an AR-HUD that superimposes visual information on surrounding vehicles, pedestrians, signal lights, signs, lanes, and the like in the actual scenery in front of the vehicle for the purpose of assisting in safe driving of the driver. For example, Japanese Patent Application Laid-open No. 2016-130771 discloses that, when displaying a virtual image that straddles the boundary between a region that is viewable with only one eye and a region that is viewable with both eyes, the brightness of the entire monocular region is set to be higher than the brightness of the entire binocular region.

Japanese Patent Application Laid-open No. 2013-112269 discloses that, in a head-up display having a central display region, a left display region, and a right display region, a small amount of information is displayed in the central display region, and information for complementing the information displayed in the central display region is sorted and displayed in the left display region and the right display region.

Japanese Patent Application Laid-open No. 2017-171146 discloses that a display device capable of displaying two images, one for the left eye and the other for the right eye, is provided, and when a detected viewpoint position of the driver is moved laterally from a reference position, among the two images of the display device, an image on a side to which the viewpoint position is moved is gradually thinned according to the amount of movement from the reference positon.

Japanese Patent Application Laid-open No. 2019-56884 discloses a configuration in which in a case of enabling viewing of images superimposed on a surrounding environment in front of a line of sight of an occupant of a vehicle, positions of both eyes and a line-of-sight direction of the occupant are acquired, and a reference line is set in a display region on the basis of an intersection point where a center line passing through a middle point between both eyes of the occupant along the line-of-sight direction intersects with the image display region, and among images displayed in the display region, an may displayed on a side corresponding to the left eye in relation to the reference line is displayed as an image viewed with only the left eye, and an image displayed on a side corresponding to the right eye in relation to the reference line is displayed as an image viewed with only the right eye.

By the way, it is easier for a driver to view a virtual image reflected in front of a vehicle with both eyes than with one eye. Therefore, even in a case where a virtual image is displayed by being superimposed on an actual scenery in front of the vehicle in a region that is viewable only with one eye, it may be difficult for the driver to recognize the virtual image, as compared with a virtual image displayed in a region that is viewable with both eyes. Therefore, there is room for improvement.

SUMMARY OF THE INVENTION

An object of the present invention is to provide a vehicle display device capable of enabling easy display recognition by a driver and assisting in safe driving by the driver.

In order to achieve the above mentioned object, a vehicle display device according to one aspect of the present invention includes an image display unit that is configured to project a display image onto a projected member of a vehicle and to display a virtual image corresponding to the display image projected onto the projected member so as to be superimposed on an actual scenery in front of the vehicle to allow a driver of the vehicle to view the virtual image; an outside information acquisition unit that is configured to acquire outside information indicating an outside situation of the vehicle; and a controller that is configured to display an outside information virtual image corresponding to the outside information in a virtual image display region in which the virtual image is displayable by the image display unit, wherein the virtual image display region includes viewing regions including: a binocular viewing region which is a portion where a right eye viewing region that is viewable with a right eye of the driver and a left eye viewing region that is viewable with a left eye of the driver overlap each other, and which is viewable with both eyes of the driver, a right monocular viewing region which is adjacent to a left side of the binocular viewing region and is a portion of the right eye viewing region excluding the left eye viewing region, and a left monocular viewing region which is adjacent to a right side of the binocular viewing region and is a portion of the left eye viewing region excluding the right eye viewing region, in a case of displaying the outside information virtual image in the right monocular viewing region and the left monocular viewing region, the controller is configured to perform a display image control for the display image displayed by the image display unit by using a viewability display form with a more excellent viewability than in a case of displaying the outside information virtual image in the binocular viewing region, and in a case of displaying the outside information virtual image in the binocular viewing region, the controller is configured to perform the display image control by using an identifiability display form that provides a more excellent recognizability of the outside information virtual image for the driver than in a case of displaying the outside information virtual image in the right monocular viewing region and the left monocular viewing region.

According to another aspect of the present invention, in the vehicle display device, it is possible to configure that in a case of using the viewability display form, a display form of the outside information virtual image is changed over time.

According to still another aspect of the present invention, in the vehicle display device, it is possible to further include that a viewpoint position acquisition unit that is configured to acquire a viewpoint position of the driver, wherein the controller is configured to set the viewing regions for the virtual image display region according to a change of the viewpoint position, and before and after the setting, in a case where a display position of the outside information virtual image in the virtual image display region is changed between the left monocular viewing region or the right monocular viewing region, and the binocular viewing region, the controller is configured to perform the display image control by using a display form corresponding to the viewing region after the change among the viewability display form and the identifiability display form.

According to still another aspect of the present invention, in the vehicle display device, it is possible to configure that the outside information includes right-side information regarding only a right side of the vehicle and left-side information regarding only a left side of the vehicle, in a case of displaying the outside information virtual image corresponding to the right-side information, the controller is configured to display the outside information virtual image in the left monocular viewing region, and in a case of displaying the outside information virtual image corresponding to the left-side information, the controller is configured to display the outside information virtual image in the right monocular viewing region.

The above and other objects, features, advantages and technical and industrial significance of this invention will be better and by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited to the embodiment described below. Components in the following embodiment include those that can be easily assumed by those skilled in the art, or those that are substantially the same. In addition, the components in the following embodiment can be omitted, replaced, or changed in various ways without departing from the gist of the invention.

Embodiment

Figure 1:
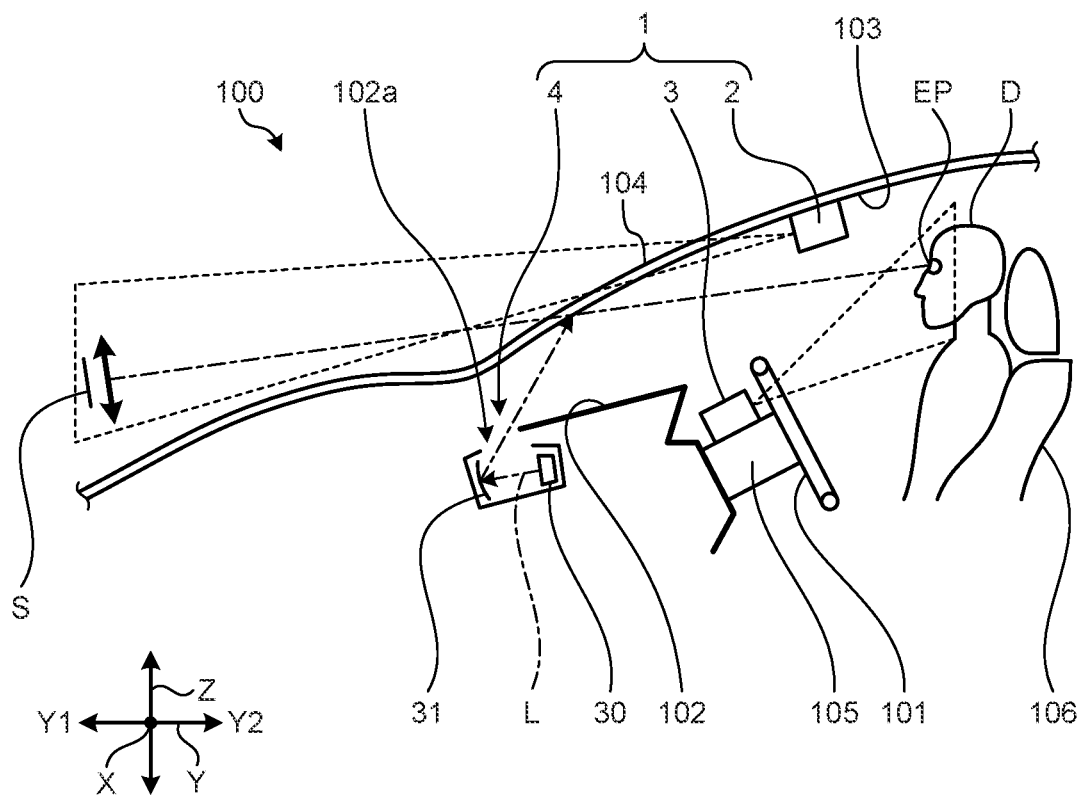
FIG. 1 is a diagram illustrating a schematic configuration of a vehicle on which a vehicle display device according to an embodiment is mounted.
Figure 2:
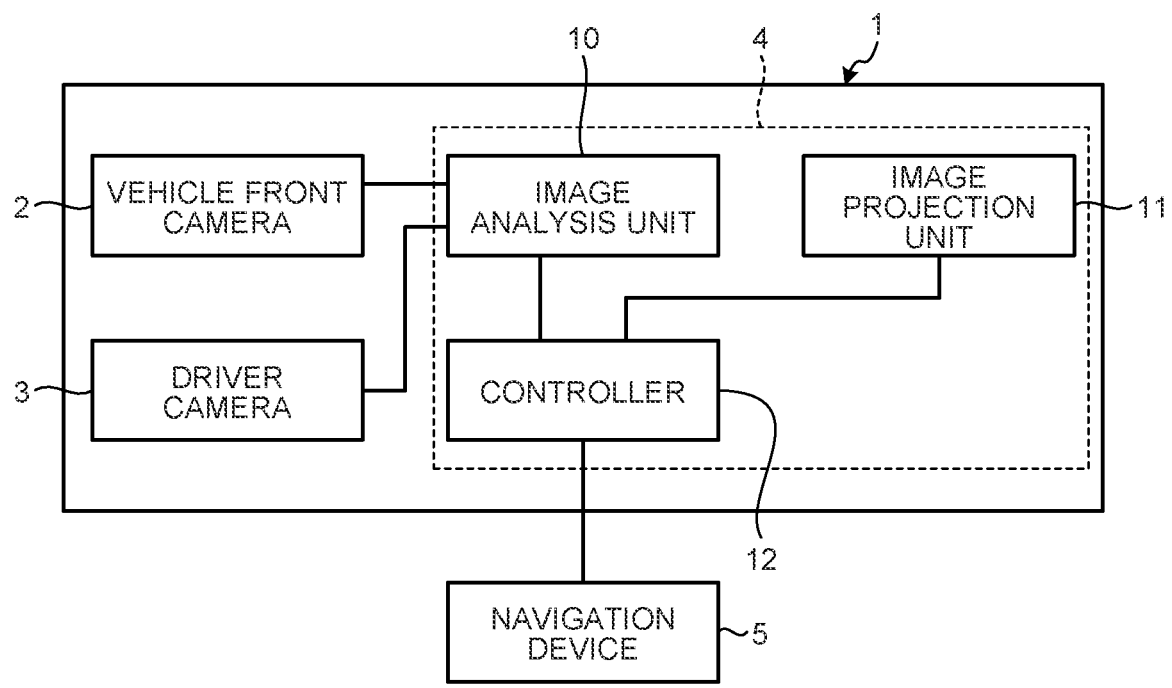
FIG. 2 is a block diagram illustrating a schematic configuration of the vehicle display device according to the embodiment.
Figure 3:
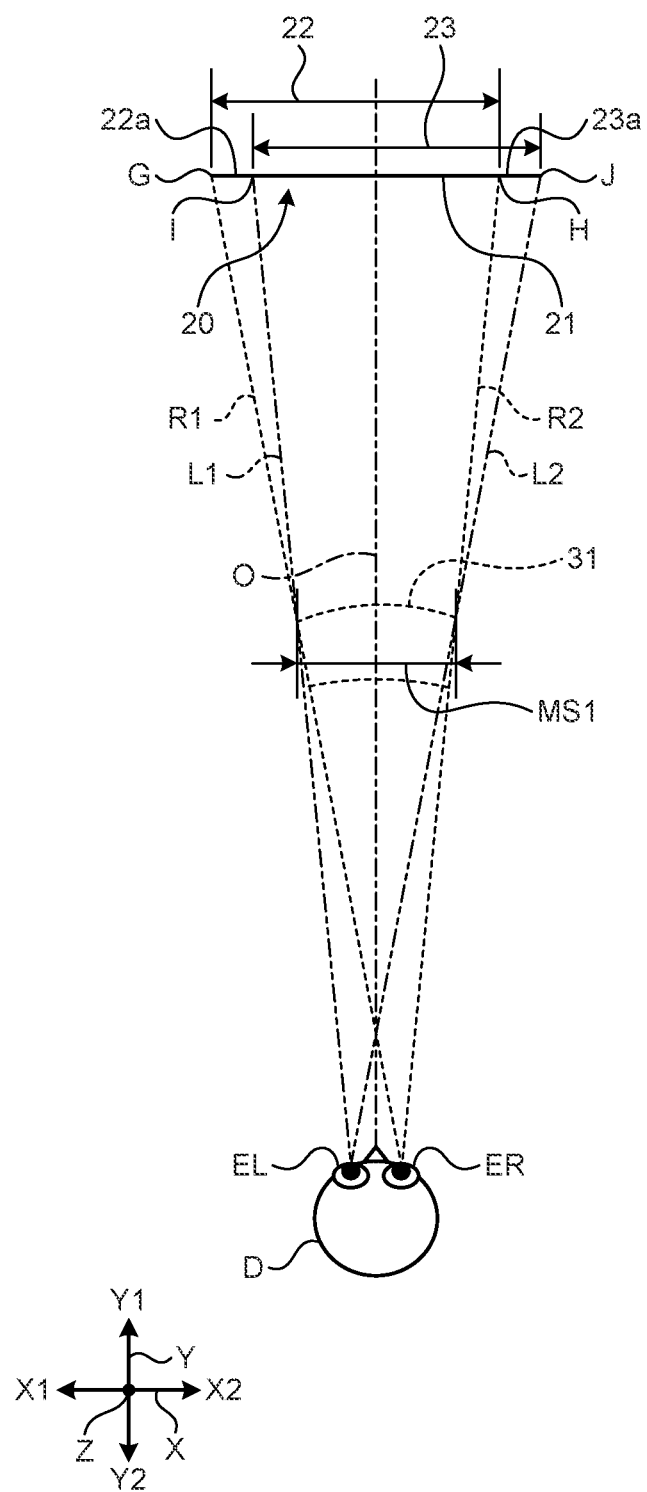
FIG. 3 is a diagram illustrating a positional relationship between an eye point and a virtual image display region in the embodiment.
Figure 4:
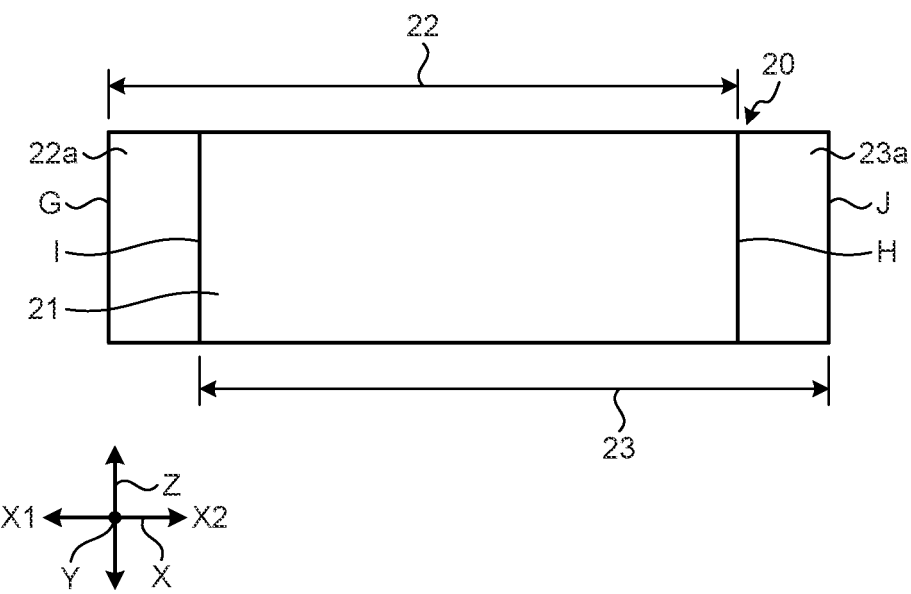
FIG. 4 is a diagram illustrating an example of a display region viewed from a traveling direction of the vehicle in the embodiment.
Figure 5:
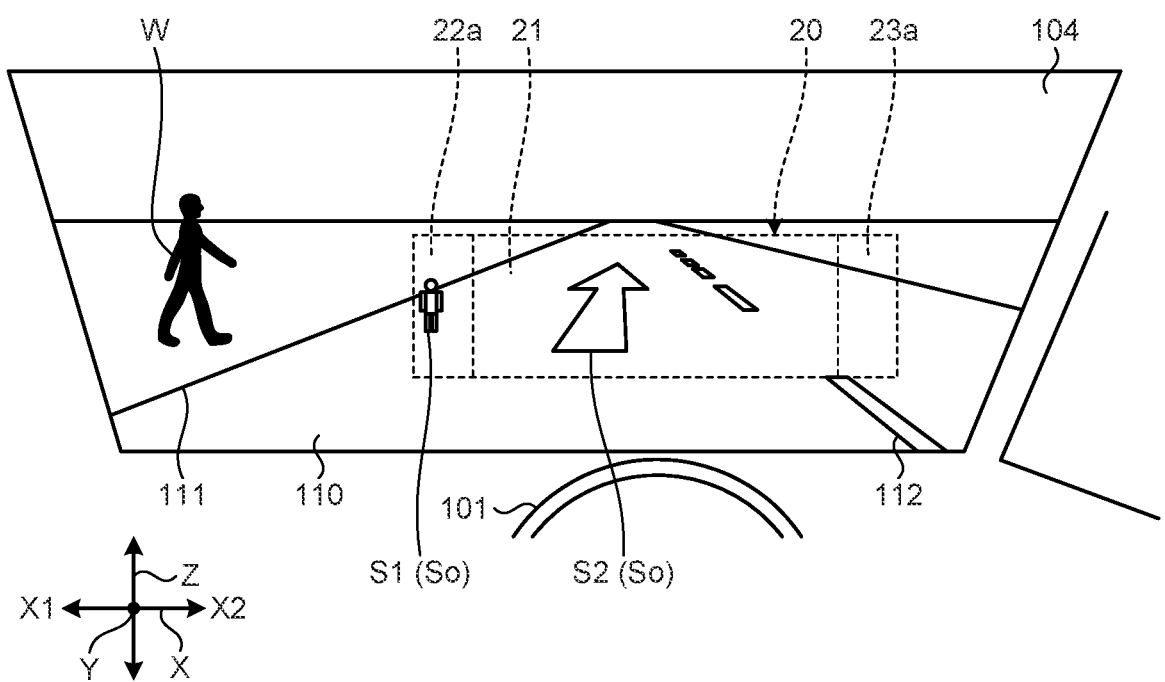
FIG. 5 is a diagram illustrating an example of a virtual image corresponding to a display image projected onto a windshield by the vehicle display device according to the embodiment.
Figure 6:
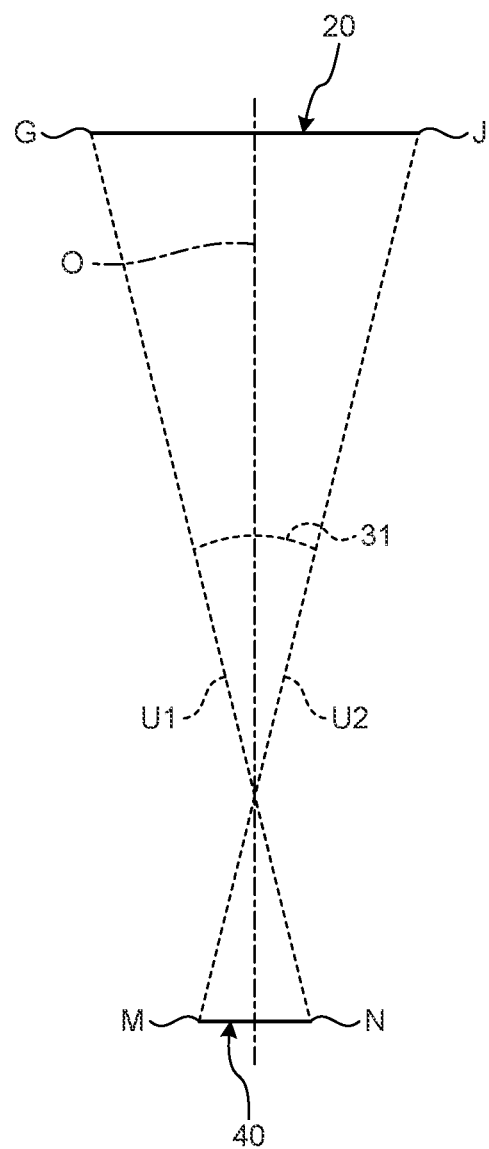
FIG. 6 is a diagram illustrating a positional relationship between a viewing range of a driver and the virtual image display region in the embodiment.
Figure 7:
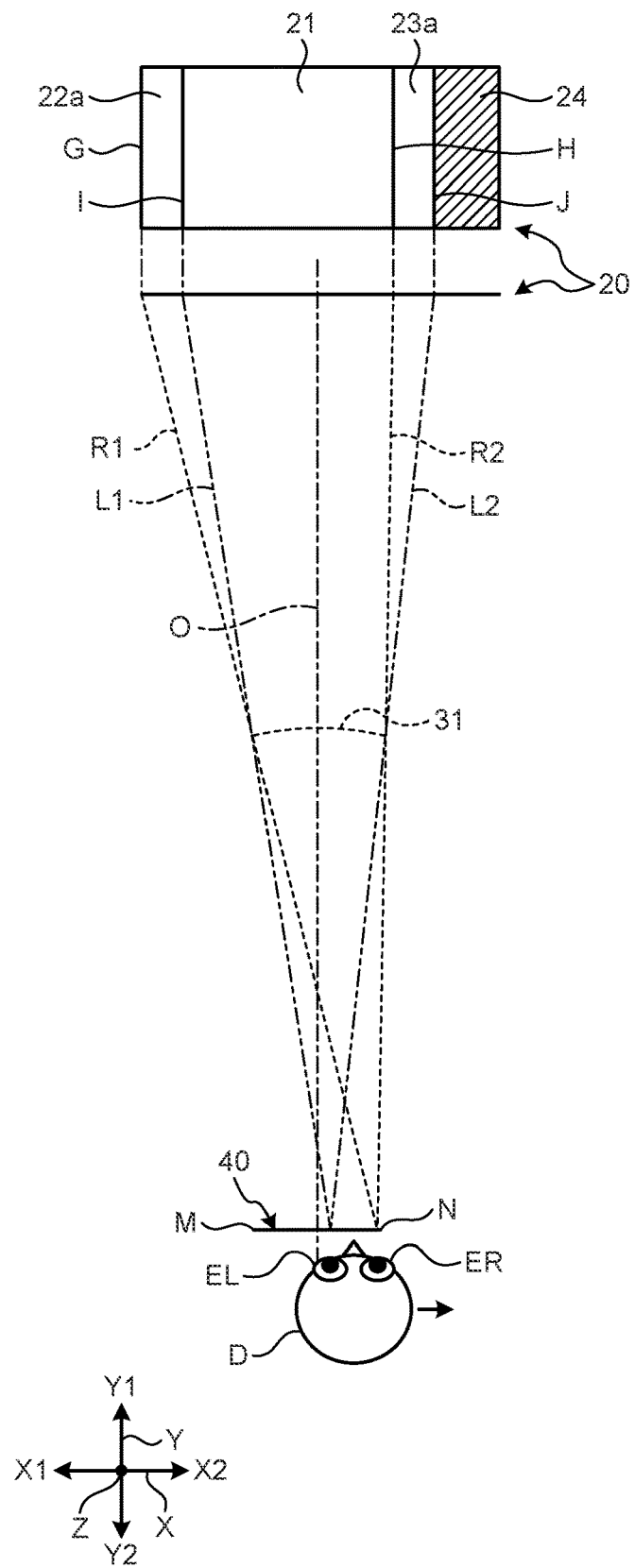
FIG. 7 is a diagram illustrating a change of a viewing region when the eye point is moved to the right in the embodiment.
Figure 8:
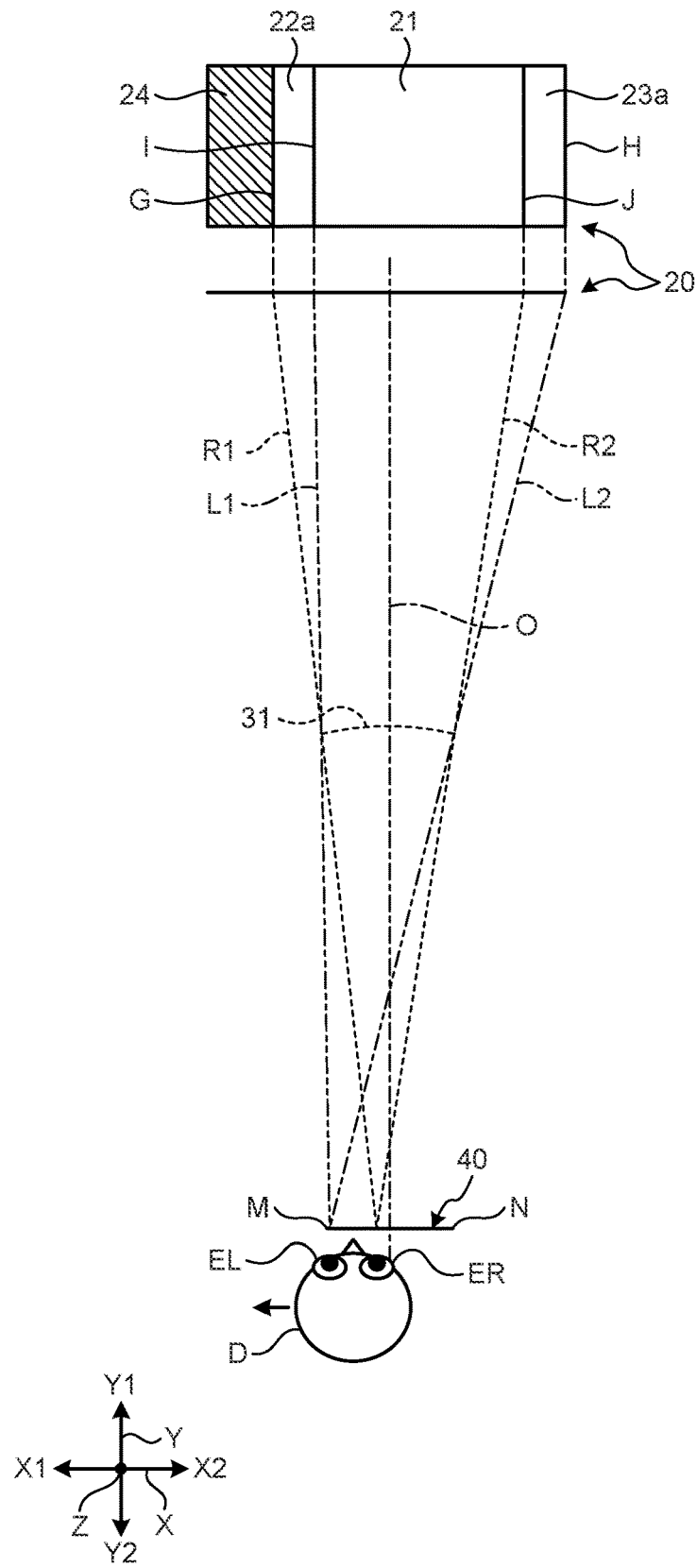
FIG. 8 is a diagram illustrating a change of the viewing region when the eye point is moved to the left in the embodiment.
Figure 9A:
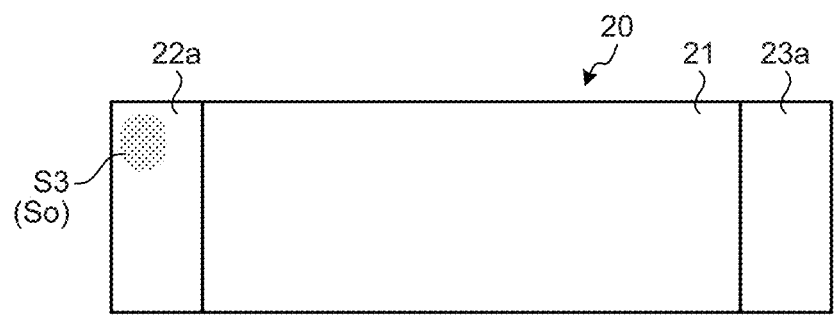
FIGS. 9A to 9C are diagrams each illustrating an example of an outside information virtual image displayed in the virtual image display region.
Figure 9B:
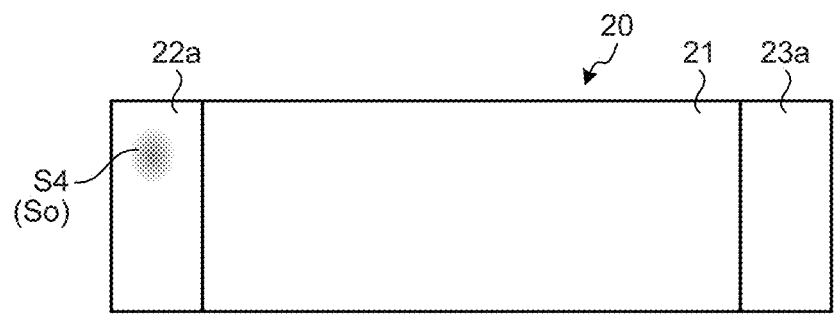
Figure 9C:
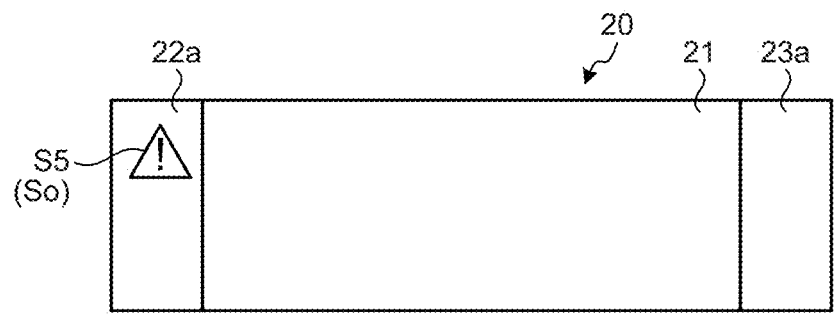

The vehicle display device according to the embodiment will be described. FIG. 1 is a diagram illustrating a schematic configuration of a vehicle on which the vehicle display device according to the embodiment is mounted. FIG. 2 is a block diagram illustrating a schematic configuration of the vehicle display device according to the embodiment. FIG. 3 is a diagram illustrating a positional relationship between an eye point and a virtual image display region in the embodiment. FIG. 4 is a diagram illustrating an example of a display region viewed from a traveling direction of the vehicle in the embodiment. FIG. 5 is a diagram illustrating an example of a virtual image corresponding to a display image projected onto a windshield by the vehicle display device according to the embodiment. FIG. 6 is a diagram illustrating a positional relationship between a viewing range of a driver and the virtual image display region in the embodiment. FIG. 7 is a diagram illustrating a change of a viewing region when the eye point is moved to the right in the embodiment. FIG. 8 is a diagram illustrating a change of the viewing region when the eye point is moved to the left in the embodiment. FIGS. 9A to 9C are diagrams each illustrating an example of an outside information virtual image displayed in the virtual image display region. Note that an optical axis O in FIGS. 3 and 6 to 8 (including FIG. 12) is an optical axis of a reflection mirror 31 as described later.

Note that, in the following description, unless otherwise specified, an X direction illustrated in FIGS. 1, and 3 to 8 (including FIG. 12) is a width direction of a vehicle in the present embodiment and is a left-right direction. A Y direction is a front-rear direction of the vehicle in the present embodiment, and is a direction orthogonal to the width direction. A Z direction is a top-bottom direction of the vehicle in the present embodiment, and is a direction orthogonal to the width direction and the front-rear direction. The X, Y, and Z directions are orthogonal to one another. Note that, for convenience, in the X direction, an X1 direction indicates a left side and an X2 direction indicates a right side, and in the Y direction, a Y1 direction indicates a front side or a traveling direction of the vehicle and a Y2 direction indicates a rear side. The Z direction is, for example, a vertical direction of the vehicle.

A vehicle display device 1 according to the present embodiment is mounted on a vehicle 100 such as an automobile. The vehicle display device 1 illustrated in FIG. 1 projects a display image onto a windshield 104 in front of a driver D of the vehicle 100 to display a virtual image corresponding to the display image projected onto the windshield 104 so than the virtual image is superimposed on an actual scenery in front of the vehicle 100, thereby allowing the driver D to view the virtual image. In (a passenger compartment of) the vehicle 100, a roof 103 is connected to an upper side of the windshield 104, and an instrument panel 102 is provided below the windshield 104. A steering wheel 101 rotatably supported by a steering column 105 is provided behind the instrument panel 102. The driver D is an occupant seated on a driver's seat 106 provided behind the steering wheel 101, and can view an area in front of the vehicle 100 through the windshield 104. The windshield 104 is an example of a projected member. The windshield 104 is semi-transparent and reflects display light L incident from the vehicle display device 1 toward an eye point EP of the driver D. The eye point EP is a viewpoint position of the driver D seated on the driver's seat 106. The driver D can view a display image projected onto the windshield 104 as a virtual image S present in front in a traveling direction of the vehicle 100. The vehicle display device 1 includes a vehicle front camera 2, a driver camera 3, and a device main body 4 (FIGS. 1 and 2). The vehicle display device 1 is connected to a navigation device 5.

The navigation device 5 is an example of an outside information acquisition unit. The navigation device 5 is a so-called car navigation system and provides map information, position information of an own vehicle, information indicating a surrounding road condition, and the like. For example, the navigation device 5 acquires a position of an own vehicle on the basis of information from a global positioning system (GPS) satellite, and acquires necessary information by using an intelligent transport system (ITS). Further, the navigation device 5 may be configured to acquire necessary information by using an advanced driver assistance system. Further, the navigation device 5 can, for example, read necessary information from an internal memory (not illustrated) and acquire necessary information from the outside by wireless communication. The navigation device 5 outputs necessary information to the vehicle display device 1 in response to an acquisition request from the vehicle display device 1.

The vehicle front camera 2 is an example of an outside information acquisition unit. The vehicle front camera 2 continuously captures an image of an actual scenery in front of the vehicle through the windshield 104, and acquires the captured image as a front image. The vehicle front camera 2 is arranged on the roof 103 or a rearview mirror (not illustrated) in a passenger compartment of the vehicle 100 (FIG. 1). The vehicle front camera 2 can, for example, capture a moving image of the actual scenery in front of the vehicle and acquire a still image obtained from the captured moving image as a front image. The vehicle front camera 2 is connected to the device main body 4 and sequentially outputs front images to the device main body 4. The vehicle front camera 2 may output the captured moving image to the device main body 4 as it is.

The driver camera 3 is an example of a viewpoint position acquisition unit. The driver camera 3 is disposed in the passenger compartment of the vehicle 100, continuously captures an image of the face of the driver D, and acquires the captured image as a driver image. The driver camera 3 is disposed, for example, on the upper side of the steering column 105 in the passenger compartment and behind the steering wheel 101 when viewed from the driver D. For example, the driver camera 3 can capture a moving image of the face of the driver D, and acquire a still image obtained from the captured moving image as a driver image. The driver camera 3 is connected to the device main body 4 and sequentially outputs driver images to the device main body 4. Note that the driver camera 3 may output the captured moving image to the device main body 4 as it is.

The device main body 4 projects a display image onto the windshield 104. The device main body 4 is disposed, for example, inside the instrument panel 102 of the vehicle 100 (FIG. 1). An opening 102*a* is provided in an upper surface of the instrument panel 102. The device main body 4 projects a display image by radiating the display light L toward the windshield 104 through the opening 102*a*. The device main body 4 in the present embodiment includes an image analysis unit 10, an image projection unit 11, and a controller 12 (FIG. 2). The image analysis unit 10 and the controller 12 are components that function on a microcontroller including, for example, a central processing unit (CPU), a memory, and various interfaces.

The image analysis unit 10 is connected to the vehicle front camera 2, the driver camera 3, and the controller 12, analyzes image signals input from the vehicle front camera 2 and the driver camera 3, and outputs analysis results to the controller 12. When the front image is input as an image signal from the vehicle front camera 2, the image analysis unit 10 specifies outside information W to be notified to the driver D on the basis of the front image. The image analysis unit 10 outputs, as an analysis result, the specified outside information W to the controller 12.

Here, the outside information W indicates an outside situation of the vehicle 100, and includes, for example, surrounding vehicles, pedestrians, signal lights, signs, lanes, and the like in the actual scenery in front of the vehicle. For example, the outside information W illustrated in FIG. 5 is a pedestrian trying to cross a road 110. The surrounding vehicles include preceding vehicles in front of the own vehicle, parked vehicles, parallel running vehicles (including light vehicles such as bicycles), and the like. The pedestrians include those who cross the road, those who walk on the road or sidewalk, and the like. The signal lights include traffic lights, railway signal lights, and the like. The signs include road signs. The lanes are legal lanes.

In a case where the driver image is input as an image signal from the driver camera 3, the image analysis unit 10 specifies a face orientation and a position of an eyeball (eye point EP) of the driver D by using a known image analysis method on the basis of the driver image. The image analysis unit 10 outputs, as an analysis result, information on the specified face orientation and eye point EP of the driver D to the controller 12.

The image projection unit 11 is an example of an image display unit. The image projection unit 11 is connected to the controller 12 and projects a display image input from the controller 12 onto the windshield 104. The image projection unit 11 includes a display 30 and the reflection mirror 31. The display 30 emits, as the display light L, a display image projected onto the windshield 104. The reflection mirror 31 is, for example, a concave mirror, and reflects, toward the windshield 104, the display light L emitted from the display 30.

The controller 12 is an example of a controller. The controller 12 controls the vehicle front camera 2, the driver camera 3, the image analysis unit 10, and the image projection unit 11. The controller 12 is connected to the navigation device 5. The controller 12 controls the image projection unit 11 on the basis of, for example, map information, position information of an own vehicle, outside information indicating a surrounding road condition, and the like, acquired from the navigation device 5 to perform a display image control for displaying the virtual image S at a predetermined position in a virtual image display region 20 in which the virtual image S can be displayed. Further, the controller 12 controls the image projection unit 11 on the basis of the outside information W input from the image analysis unit 10 and the information on the face orientation and eye point EP of the driver D to perform a display image control for displaying the virtual image S at a predetermined position in the virtual image display region 20. The controller 12 of the present embodiment performs a display image control for displaying an outside information virtual image So corresponding to the outside information W in the virtual image display region 20. The outside information virtual image So is included in the virtual image S described above. The virtual image S of the present embodiment includes, in addition to the outside information virtual image So, a virtual image corresponding to information regarding the vehicle 100 (for example, a vehicle speed, an engine speed, and a cooling water temperature) and the like.

Here, the virtual image display region 20 is a region in which the virtual image S can be displayed by the image projection unit 11 and through which the driver D can view the virtual image S. As illustrated in FIGS. 3 to 5, the virtual image display region 20 includes viewing regions including a binocular viewing region 21, a right monocular viewing region 22a, and a left monocular viewing region 23a. The binocular viewing region 21 is a portion where a right eye viewing region 22 and a left eye viewing region 23 overlap each other, and is a viewing region that is viewable with both eyes (right eye ER and left eye EL) of the driver D.

Figure 13:
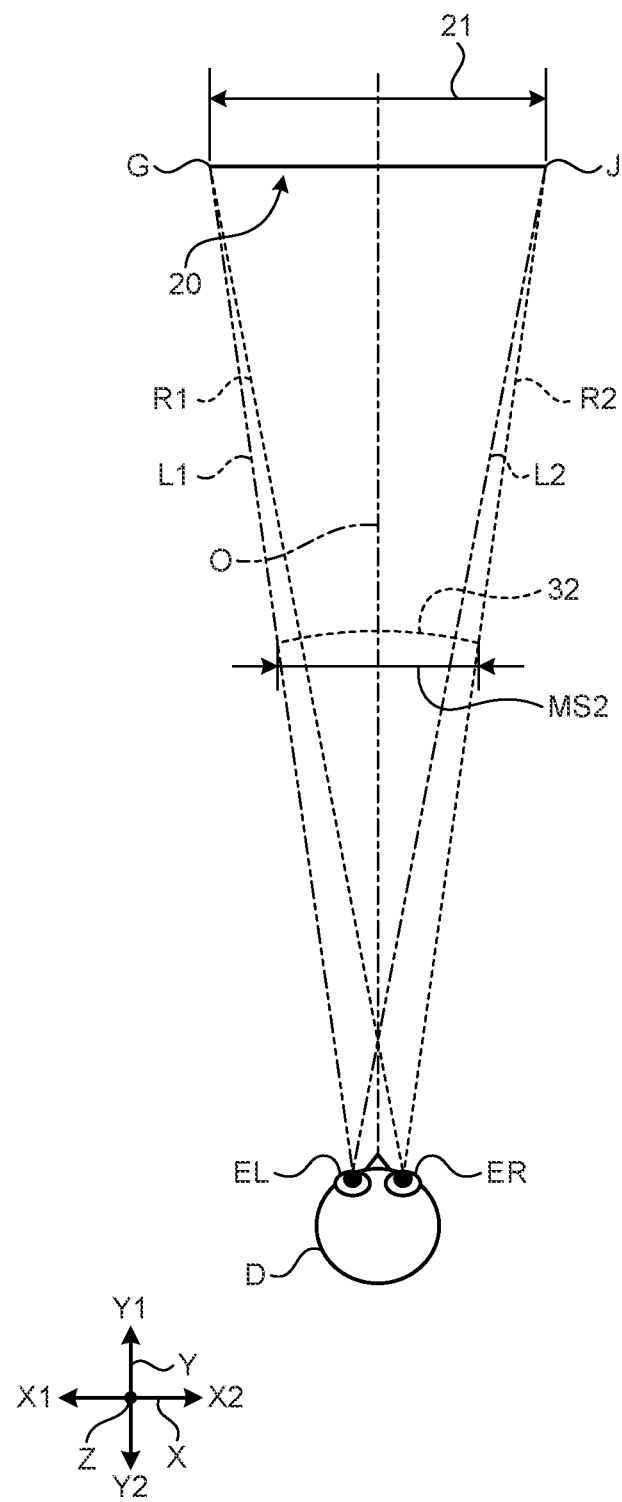
FIG. 13 is a diagram illustrating a positional relationship between an eye point and a virtual image display region in a vehicle display device in which only a binocular viewing region is configured.

In a case where the binocular viewing region 21, and the right monocular viewing region 22a and the left monocular viewing region 23a, which are one-eye viewing regions, are provided in the virtual image display region 20, a size of a reflection mirror 32 can be smaller than that of a vehicle display device in which only the binocular viewing region is configured as illustrated in FIG. 13. A length MS2 of a reflection mirror 32 illustrated in FIG. 13 in the width direction and a length MS1 of the reflection mirror 31 illustrated in FIG. 3 in the width direction satisfy a relationship of MS2>MS1. By reducing the size of the reflection mirror 32 as described above, it is possible to implement the device having a smaller size as compared with the vehicle display device in which only the binocular viewing region is configured. Further, in a case where the binocular viewing region and the one-eye viewing region are provided, the reflection mirror 32 can have a smaller size than that of the vehicle display device in which only the binocular viewing region is configured in the virtual image display region 20 having the same size. Therefore, the virtual image display region 20 can be enlarged by increasing the size of the reflection mirror 31.

The right eye viewing region 22 is a viewing region that is viewable with the right eye ER of the driver D. As illustrated in FIGS. 3 and 4, the right eye viewing region 22 occupies between G and H of the virtual image display region 20 in the left-right direction. The right monocular viewing region 22a is a portion of the right eye viewing region 22 excluding the left eye viewing region 23, the portion being adjacent to a left side of the binocular viewing region 21 in the virtual image display region 20. For example, in a case where the virtual image S is displayed in the right monocular viewing region 22a, the right monocular viewing region 22a is a region that is viewable with the right eye ER of the driver D, but is not viewable with the left eye EL. As illustrated in FIGS. 3 and 4, the right monocular viewing region 22a occupies between G and I of the virtual image display region 20 in the left-right direction.

The left eye viewing region 23 is a viewing region that is viewable with the left eye EL of the driver D. As illustrated in FIGS. 3 and 4, the left eye viewing region 23 occupies between I and J of the virtual image display region 20 in the left-right direction. The left monocular viewing region 23a is a portion of the left eye viewing region 23 excluding the right eye viewing region 22, the portion being adjacent to a right side of the binocular viewing region 21 in the virtual image display region 20. For example, in a case where the virtual image S is displayed in the left monocular viewing region 23a, the left monocular viewing region 23a is a region that is viewable with the left eye EL of the driver D, but is not viewable with the right eye ER. As illustrated in FIGS. 3 and 4, the left monocular viewing region 23a occupies between H and J of the virtual image display region 20 in the left-right direction.

G positioned at a left end of the virtual image display region 20 is positioned on an extension of a ray R1 connecting the right eye ER of the driver D and a left end of the reflection mirror 31. H positioned at a right end of the virtual image display region 20 is positioned on an extension of a ray L2 connecting the left eye EL of the driver D and a right end of the reflection mirror 31. I positioned at a left end of the binocular viewing region 21 is positioned on an extension of a ray L1 connecting the left eye EL of the driver D and the left end of the reflection mirror 31. J positioned at a right end of the binocular viewing region 21 is positioned on an extension of a ray R2 connecting the right eye ER of the driver D and the right end of the reflection mirror 31.

In a case of displaying the outside information virtual image So in the right monocular viewing region 22a and the left monocular viewing region 23a (hereinafter, also simply referred to as the "monocular viewing region (22a or 23a)"), the controller 12 performs a display image control for a display image displayed by the image projection unit 11, by using a viewability display form with a more excellent viewability than in a case of displaying the outside information virtual image So in the binocular viewing region 21. For example, in a case of displaying the outside information virtual image So in the monocular viewing region, the controller 12 performs, for example, a display image control for displaying an as the viewability display form with an excellent viewability than the binocular viewing region 21 in which the outside information virtual image So is superimposed on a pedestrian in the actual scenery, without superimposing the outside information virtual image So on the pedestrian. In a case of displaying the outside information virtual image So so as to be superimposed on a superimposition target (for example, a pedestrian), in general, when the outside information virtual image So is displayed so as to be superimposed on the superimposition target or displayed in a bright color with strong stimulation, it becomes difficult for the driver D to recognize the actual superimposition target. Further, since the outside information virtual image So is superimposed on the superimposition target, a form in which the outside information virtual image So is displayed is likely to be limited. Therefore, the superimposed outside information virtual image So is likely to be displayed in a relatively modest viewability display form. Therefore, an icon or the like having a brighter color or a shape having a higher viewability than the outside information virtual image So displayed in the binocular viewing region 21 is displayed, such that the driver D can easily recognize the outside information virtual image So. An outside information virtual image S1 (So) illustrated in FIG. 5 is a so-called man-shaped icon, and is displayed in a case where left-side information in the outside information W is a pedestrian crossing in front of the vehicle 100 from the left to the right. In this case, the man-shaped icon corresponding to a pedestrian, which is outside information, is displayed as the outside information virtual image So.

Further, in a case of displaying the outside information virtual image So in the binocular viewing region 21, the controller 12 performs a display image control by using an identifiability display form that provides a more excellent recognizability of the outside information virtual image So for the driver D than in a case of displaying the outside information virtual image So in the monocular viewing region. As described above, in a case of displaying the outside information virtual image So in the binocular viewing region 21, the controller 12 performs a display image control to display the outside information virtual image So so as to be superimposed on the scenery in front of the vehicle 100, in the identifiability display form that provides an excellent recognizability of the outside information virtual image So for the driver D. An outside information virtual image S2 (So) illustrated in FIG. 5 is a so-called arrow icon, and is displayed in a case where the outside information W is a traveling direction of the vehicle 100. This outside information W is obtained from, for example, the navigation device 5. The outside information virtual image S2 is displayed by being superimposed on lanes 111 and 112 extending toward the front of the vehicle 100 in the binocular viewing region 21, and is deformed into a shape that matches the lanes 111 and 112.

The controller 12 sets viewing regions for the virtual image display region 20 according to a change of the eye point EP. Before and after the setting described above, in a case where a display position of the outside information virtual image So in the virtual image display region 20 is changed between the left monocular viewing region 23a or the right monocular viewing region 22a, and the binocular viewing region 21, the controller 12 performs a display image control by using a display form corresponding to the viewing region after the change among the viewability display form and the identifiability display form.

The ranges of the binocular viewing region 21, the right monocular viewing region 22a, and the left monocular viewing region 23a in the virtual image display region 20 are changed according to the change of the eye point EP of the driver D. FIG. 6 illustrates a positional relationship between a viewing range 40 of the driver D that corresponds to the change of the eye point EP, the reflection mirror 31, and the virtual image display region 20. In FIG. 6, G positioned at the left end of the virtual image display region 20 is positioned on an extension of a straight line U1 connecting a right end N of the viewing range 40 and the left end of the reflection mirror 31. J positioned at the right end of the virtual image display region 20 is positioned on an extension of a straight line U2 connecting a left end M of the viewing range 40 and the right end of the reflection mirror 31. For example, when the eye point EP is moved toward the right end of the viewing range 40, as illustrated in FIG. 7, each of the binocular viewing region 21, the right monocular viewing region 22a, and the left monocular viewing region 23a are moved toward the left end of the virtual image display region 20 while being reduced in size in the left-right direction, and an unviewable region 24 is formed at the right end of the virtual image display region 20. Further, when the eye point EP is moved toward the left end of the viewing range 40, as illustrated in FIG. 8, each of the binocular viewing region 21, the right monocular viewing region 22a, and the left monocular viewing region 23a are moved toward the right end of the virtual image display region 20 while being reduced in size in the left-right direction, and the unviewable region 24 is formed at the left end of the virtual image display region 20. This unviewable region 24 is a region that is not viewable with the right eye ER, the left eye EL, or both eyes of the driver D. Even when the virtual image S including the outside information virtual image So is displayed in the unviewable region 24, the driver D cannot view the virtual image S.

Based on the above description, a case where the eye point EP of the driver D is changed from the center to the right end side in the viewing range 40 in a state where the outside information virtual image So is displayed in the right monocular viewing region 22a will be described. A display position of the outside information virtual image So in the virtual image display region 20 is not changed before and after the change of the eye point EP, but each of the binocular viewing region 21, the right monocular viewing region 22a, and the left monocular viewing region 23a is moved toward the left end of the virtual image display region 20. Therefore, in a case where a display position of the outside information virtual image So is changed between the right monocular viewing region 22a and the binocular viewing region 21, the controller 12 performs a display image control by using a display form corresponding to the viewing region after the change, here, the binocular viewing region 21, among the viewability display form and the identifiability display form. As a result, the display form of the outside information virtual image So is changed from the viewability display form to the identifiability display form. For example, in a case where an outside information virtual image S3 (So) illustrated in FIG. 9A is displayed in the right monocular viewing region 22a, the outside information virtual image S3 is displayed in the viewability display form with a simple shape and a high viewability. On the other hand, in a case where the outside information virtual image S2 illustrated in FIG. 5 is displayed in the binocular viewing region 21, the outside information virtual image S2 is displayed in the identifiability display form and is displayed by being superimposed on the outside information W (here, a pedestrian) in the actual scenery. In this way, for example, in a case where the display position of the outside information virtual image So is changed between the right monocular viewing region 22a and the binocular viewing region 21, the controller 12 changes the display form of the outside information virtual image So without changing the display position in the virtual image display region 20.

In the vehicle display device 1 described above, in a case of displaying the outside information virtual image So in the right monocular viewing region 22a and the left monocular viewing region 23a, the controller 12 performs a display image control for a display image displayed by the image projection unit 11 by using the viewability display form with a more excellent viewability than in a case of displaying the outside information virtual image So in the binocular viewing region 21. In a case of displaying the outside information virtual image So in the binocular viewing region 21, the controller 12 performs a display image control by using the identifiability display form that provides a more excellent recognizability of the outside information virtual image So for the driver D than in a case of displaying the outside information virtual image So in the right monocular viewing region 22a and the left monocular viewing region 23a.

With the above configuration, for example, in a case where the outside information virtual image So is displayed in the monocular viewing region (22a or 23a), the driver D can be conscious of the right side or the left side of the vehicle 100 without recognizing the meaning of the outside information virtual image So. As a result, it is possible to enable easy display recognition by the driver D and assist in safe driving by the driver D. Since it is easier for driver D to view with both eyes than with one eye, recognition cannot be made when a virtual image having the same identifiability as that of the outside information virtual image So displayed in the binocular viewing region 21 is displayed in the monocular viewing region. Therefore, since it is difficult for the driver D to recognize the outside information virtual image So displayed in the monocular viewing region even in a case where the outside information virtual image So has a high identifiability, the outside information virtual image So in the viewability display form with a more excellent viewability than that of the outside information virtual image So displayed in the binocular viewing region 21 is displayed in the monocular viewing region. Further, the recognizability of the virtual image displayed in the monocular viewing region may be improved by improving the viewability of the outside information virtual image So displayed in the binocular viewing region 21 in relation to the outside information virtual image So displayed in the monocular viewing region. However, since the virtual image displayed in the binocular viewing region is mainly superimposed on the actual scenery, it is not necessary to improve the viewability of the virtual image, and it may be rather annoying to the driver to improve the viewability. On the other hand, even when the virtual image displayed in the monocular viewing region is superimposed on the actual scenery, the virtual image displayed in the monocular viewing region is difficult to be recognized by the driver D, and thus, even when the viewability of the virtual image is improved, it would not be as annoying as increasing the viewability of the virtual image displayed in the binocular viewing region 21.

Further, in the vehicle display device 1 in the present embodiment, before and after setting viewing regions for the virtual image display region 20 according to the change of the eye point EP, in a case where a display position of the outside information virtual image So in the virtual image display region 20 is changed between the monocular viewing region and the binocular viewing region 21, the controller 12 performs a display image control by using a display form corresponding to the viewing region after the change among the viewability display form and the identifiability display form. As a result, even when the eye point EP of the driver D is changed, it is possible to display, in the monocular viewing region, the virtual image in the viewability display form with a more excellent viewability than that of the virtual image displayed in the binocular viewing region 21. On the other hand, even when the eye point EP of the driver D is changed, it is possible to display, in the binocular viewing region 21, the virtual image in the identifiability display form that provides a more excellent recognizability for the driver D than that of the virtual image displayed in the monocular viewing region. As a result, it is possible to further assist in the safe driving by the driver D.

In the above-described embodiment, the controller 12 performs a display image control so as to display a man-shaped icon corresponding to a pedestrian as the above-described viewability display form with an excellent viewability, but the present invention is not limited thereto. For example, the outside information virtual images S3 and S4 (So) illustrated in FIGS. 9A and 9B, and an outside information virtual image S5 (So) illustrated in FIG. 9C may be examples thereof. The outside information virtual image S4 illustrated in FIG. 9B has a form in which a so-called gradation is added to the outside information virtual image S3 illustrated in FIG. 9A. The outside information virtual images S3 and S4 are so-called indicators as the viewability display forms with an excellent viewability. The outside information virtual image S5 is an icon imitating a safety sign, as the viewability display form with an excellent viewability. Since the outside information virtual images S3 to S5 are all displayed in the right monocular viewing region 22a, they are displayed when the driver D is directed to the left side of the vehicle 100. On the other hand, when the driver D is directed to the right side of the vehicle 100, the outside information virtual images S3 to S5 are displayed in the left monocular viewing region 23a. Note that a case where the viewability display form with an excellent viewability is an icon, indicator, or the like obtained by changing a color, shape, or the like of the identifiability display form has been described by way of example, but the present invention is not limited thereto.

Figure 10:
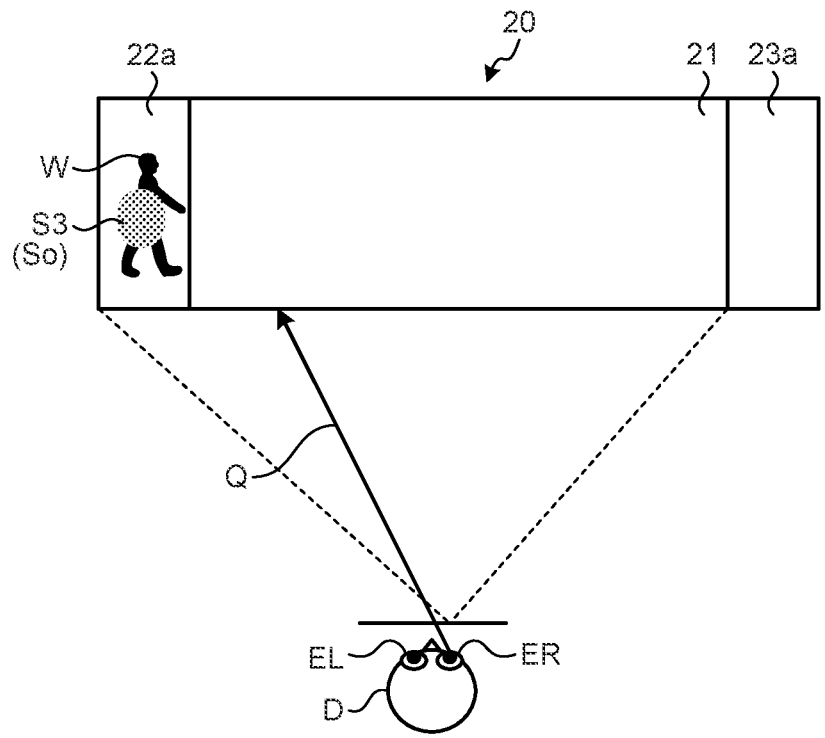
FIG. 10 is a diagram illustrating an example before a change of a display form of the outside information virtual image in a modified example of the embodiment.
Figure 11:
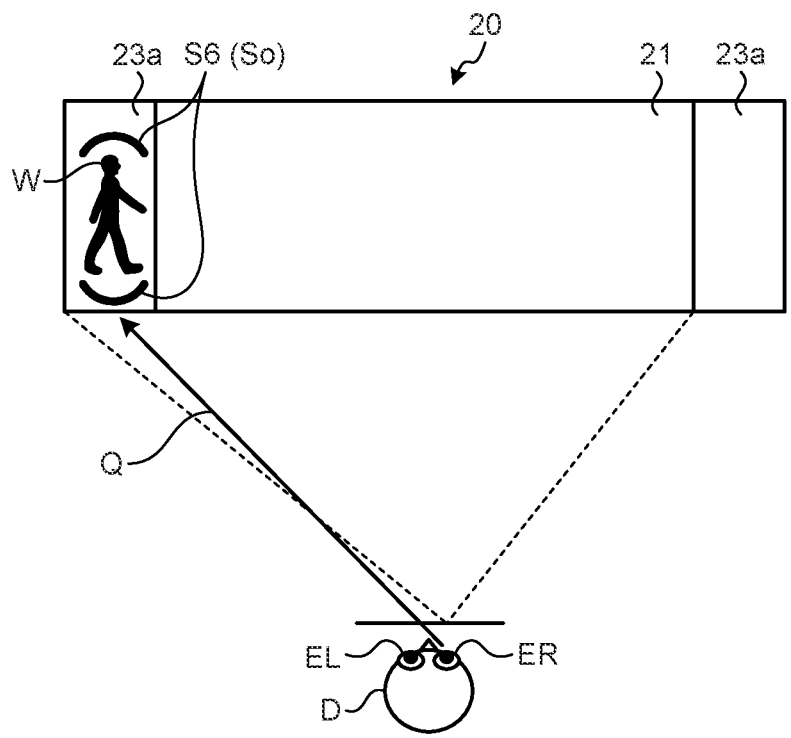
FIG. 11 is a diagram illustrating an example after the change of the display form of the outside information virtual image in the modified example of the embodiment.
Figure 12:
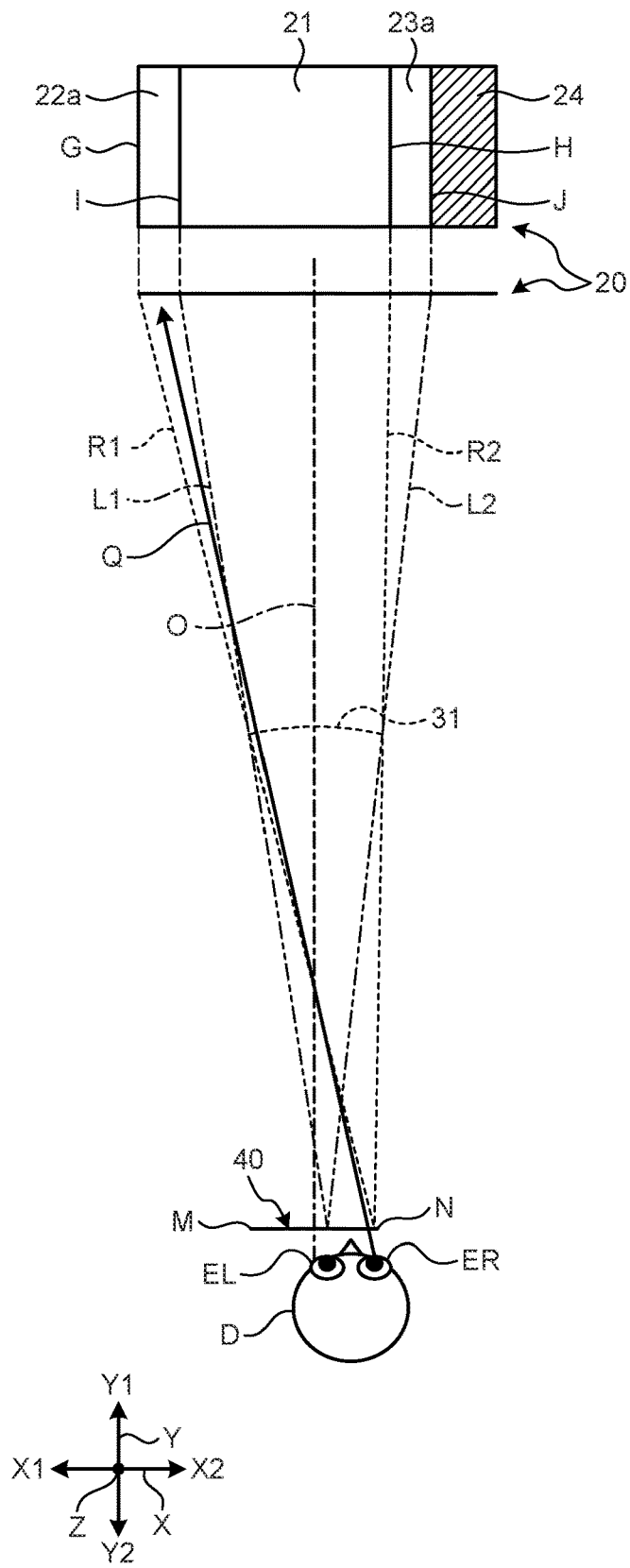
FIG. 12 is a diagram illustrating an example after a change of a line-of-sight direction of the driver in the modified example of the embodiment.

Next, a vehicle display device according to a modified example of the embodiment will be described. FIG. 10 is a diagram illustrating an example before a change of a display form of the outside information virtual image in the modified example of the embodiment. FIG. 11 is a diagram illustrating an example after the change of the display form of the outside information virtual image in the modified example of the embodiment. FIG. 12 is a diagram illustrating an example after a change of a line-of-sight direction of the driver in the modified example of the embodiment.

The controller 12 can acquire a line-of-sight direction Q of the driver D on the basis of the information on the face orientation and eye point EP of the driver D. The controller 12 sets viewing regions for the virtual image display region 20 according to a change of the line-of-sight direction Q of the driver D. Before and after the setting described above, in a case where the line-of-sight direction Q with respect to the virtual image display region 20 is changed between the left monocular viewing region 23a or the right monocular viewing region 22a, and the binocular viewing region 21, the controller 12 performs a display image control by using a display form corresponding to the line-of-sight direction Q after the change (FIGS. 11 and 12) among the viewability display form and the identifiability display form. In a case where it is determined that the line-of-sight direction Q of the driver D is directed to the binocular viewing region 21, for example, the controller 12 performs a display image control for the outside information virtual image So to be displayed in the right monocular viewing region 22a by using the viewability display form (outside information virtual image S3) with an excellent viewability (FIG. 10). In this state, in a case where the line-of-sight direction Q of the driver D is changed to be directed to the right monocular viewing region 22a, the controller 12 performs a display image control for the outside information virtual image S3 to be displayed in the right monocular viewing region 22a by using the identifiability display form (outside information virtual image S6) with an excellent recognizability for the driver D.

With the above-described configuration, the vehicle display device 1 in the modified example of the embodiment described above can change the display form according to the line-of-sight direction Q of the driver D, and enable easier display recognition by the driver D.

Note that, in the above-described embodiment and the modified example thereof, in a case of displaying the outside information virtual image So in each monocular viewing region (22a or 23a), the controller 12 performs a display image control by using the viewability display form with a more excellent viewability than in a case of displaying the outside information virtual image So in the binocular viewing region 21, but the present invention is not limited thereto. For example, the controller 12 may be configured so that the display form of the outside information virtual image So is changed over time in a case of performing the display image control by using the viewability display form. With the above-described configuration, the viewability of the outside information virtual image So can be further improved.

Further, in the above-described embodiment and the modified example thereof, the outside information W indicates an overall outside situation of the vehicle 100, but is not limited thereto, and may include right-side information regarding only the right side of the vehicle 100 and the left-side information regarding only the left side of the vehicle 100. The right-side information includes, for example, a vehicle or pedestrian crossing in front of the vehicle 100 from the right to the left, an oncoming vehicle or pedestrian traveling from the front-right side to the rear side of the vehicle 100, a right side lane (including a centerline and median strip) positioned on the front-right side of the vehicle 100, and the like. The left-side information includes, for example, a vehicle or pedestrian crossing in front of the vehicle 100 from the left to the right, a parked vehicle or signal lights located on the front-left side of the vehicle 100, a sign, a left side lane, and the like.

In a case of displaying the outside information virtual image So corresponding to the right-side information, the controller 12 displays the outside information virtual image So in the left monocular viewing region 23a, and in a case of displaying the outside information virtual image So corresponding to the left-side information, the controller 12 displays the outside information virtual image So in the right monocular viewing region 22a. For example, in a case of displaying the outside information virtual image So corresponding to a parked vehicle on the front-left side of the vehicle 100, even when the outside information virtual image So corresponds to the left-side information, the controller 12 performs a superimposition display in the binocular viewing region 21 according to a position of the parked vehicle. Thereafter, when the vehicle 100 moves in the traveling direction and the position of the parked vehicle approaches the own vehicle, the controller 12 changes a display position of the outside information virtual image So from the binocular viewing region 21 to the right monocular viewing region 22a corresponding to the left side. At this time, the display form of the outside information virtual image So is changed from the identifiability display form to the viewability display form to use a display form corresponding to the viewing region after the change.

For example, in a case of displaying the outside information virtual image So corresponding to another vehicle crossing in front of the stopped vehicle 100 from the right to the left, the controller 12 displays the outside information virtual image So in the left monocular viewing region 23a corresponding to the right side.

Thereafter, when another vehicle moves from the right to the left, the controller 12 changes a display position of the outside information virtual image So from the left monocular viewing region 23a to the binocular viewing region 21. At this time, the display form of the outside information virtual image So is changed from the viewability display form to the identifiability display form to use a display form corresponding to the viewing region after the change.

In a case of displaying the outside information virtual image So corresponding to the right-side information in the left monocular viewing region 23a, the controller 12 displays nothing in the right monocular viewing region 22a. Further, in a case of displaying the outside information virtual imago So corresponding to the left-side information in the right monocular viewing region 22a, the controller 12 displays nothing in the left monocular viewing region 23a.

Further, in the above-described embodiment and the modified example thereof, in a case of displaying the outside information virtual image So in the left monocular viewing region 23a, the controller 12 displays nothing in the right monocular viewing region 22a, and in a case of displaying the outside information virtual image So in the right monocular viewing region 22a, the controller 12 displays nothing in the left monocular viewing region 23a, but the present invention is not limited thereto. For example, the controller 12 may display the outside information virtual image So having the same or different display form in each of the left monocular viewing region 23a and the right monocular viewing region 22a. In this case, for example, when notifying the driver D that an emergency has occurred in the vehicle 100, the driver D can quickly recognize the emergency on the basis of the display performed as described above.

Further, in the above-described embodiment and the modified example thereof, the vehicle front camera 2 and the navigation device 5 have been exemplified as the outside information acquisition units, but the present invention is not limited thereto. For example, the outside information acquisition unit may be a laser radar, a millimeter wave radar, or the like.

Further, in the above-described embodiment and the modified example thereof, the vehicle display device 1 projects a display image onto the windshield 104 of the vehicle 100, but the present invention is not limited thereto, and the display image may be projected onto, for example, a combiner or the like.

Further, in the above-described embodiment and the modified example thereof, the vehicle display device 1 is applied to the vehicle 100 such as an automobile, but the present invention is not limited thereto, and the vehicle display device 1 may be applied to, for example, a vessel or an aircraft other than the vehicle 100.

The vehicle display device according to the present embodiment has an effect of enabling easy display recognition by a driver and assisting in safe driving by the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an image display unit that is configured to project a display image onto a projected member of a vehicle and to display a virtual image corresponding to the display image projected onto the projected member so as to be superimposed on an actual scenery in front of the vehicle to allow a driver of the vehicle to view the virtual image;

an outside information acquisition unit that is configured to acquire outside information indicating an outside situation of the vehicle; and a controller that is configured to display an outside information virtual image corresponding to the outside information in a virtual image display region in which the virtual image is displayable by the image display unit, wherein the virtual image display region includes viewing regions including:

a binocular viewing region which is a portion where a right eye viewing region that is viewable with a right eye of the driver and a left eye viewing region that is viewable with a left eye of the driver overlap each other, and which is viewable with both eyes of the driver, a right monocular viewing region which is adjacent to a left side of the binocular viewing region and is a portion of the right eye viewing region excluding the left eye viewing region, and a left monocular viewing region which is adjacent to a right side of the binocular viewing region and is a portion of the left eye viewing region excluding the right eye viewing region, in a case of displaying the outside information virtual image in the right monocular viewing region and the left monocular viewing region, the controller is configured to perform a display image control for the display image displayed by the image display unit by using a viewability display form with a more excellent viewability than in a case of displaying the outside information virtual image in the binocular viewing region, and in a case of displaying the outside information virtual image in the binocular viewing region, the controller is configured to perform the display image control by using an identifiability display form that provides a more excellent recognizability of the outside information virtual image for the driver than in a case of displaying the outside information virtual image in the right monocular viewing region and the left monocular viewing region.

2. The vehicle display device according to claim 1, wherein
in a case of using the viewability display form, a display form of the outside information virtual image is changed over time.

3. The vehicle display device according to claim 1, further comprising:
a viewpoint position acquisition unit that is configured to acquire a viewpoint position of the driver, wherein
the controller is configured to set the viewing regions for the virtual image display region according to a change of the viewpoint position, and
before and after the setting, in a case where a display position of the outside information virtual image in the virtual image display region is changed between the left monocular viewing region or the right monocular viewing region, and the binocular viewing region, the controller is configured to perform the display image control by using a display form corresponding to the viewing region after the change among the viewability display form and the identifiability display form.

4. The vehicle display device according to claim 2, further comprising:
a viewpoint position acquisition unit that is configured to acquire a viewpoint position of the driver, wherein the controller is configured to set the viewing regions for the virtual image display region according to a change of the viewpoint position, and
before and after the setting, in a case where a display position of the outside information virtual image in the virtual image display region is changed between the left monocular viewing region or the right monocular viewing region, and the binocular viewing region, the controller is configured to perform the display image control by using a display form corresponding to the viewing region after the change among the viewability display form and the identifiability display form.

5. The vehicle display device according to claim 1, wherein
the outside information includes right-side information regarding only a right side of the vehicle and left-side information regarding only a left side of the vehicle,
in a case of displaying the outside information virtual image corresponding to the right-side information, the controller is configured to display the outside information virtual image in the left monocular viewing region, and
in a case of displaying the outside information virtual image corresponding to the left-side information, the controller is configured to display the outside information virtual image in the right monocular viewing region.

6. The vehicle display device according to claim 2, wherein
the outside information includes right-side information regarding only a right side of the vehicle and left-side information regarding only a left side of the vehicle,
in a case of displaying the outside information virtual image corresponding to the right-side information, the controller is configured to display the outside information virtual image in the left monocular viewing region, and
in a case of displaying the outside information virtual image corresponding to the left-side information, the controller is configured to display the outside information virtual image in the right monocular viewing region.

7. The vehicle display device according to claim 3, wherein
the outside information includes right-side information regarding only a right side of the vehicle and left-side information regarding only a left side of the vehicle,
in a case of displaying the outside information virtual image corresponding to the right-side information, the controller is configured to display the outside information virtual image in the left monocular viewing region, and
in a case of displaying the outside information virtual image corresponding to the left-side information, the controller is configured to display the outside information virtual image in the right monocular viewing region.

8. The vehicle display device according to claim 4, wherein
the outside information includes right-side information regarding only a right side of the vehicle and left-side information regarding only a left side of the vehicle,
in a case of displaying the outside information virtual image corresponding to the right-side information, the controller is configured to display the outside information virtual image in the left monocular viewing region, and in a case of displaying the outside information virtual image corresponding to the left-side information, the controller is configured to display the outside information virtual image in the right monocular viewing region.

* * * * *